United States Patent [19]

Smedley

[11] Patent Number: 5,278,490
[45] Date of Patent: Jan. 11, 1994

[54] ONE-CYCLE CONTROLLED SWITCHING CIRCUIT

[75] Inventor: Keyue M. Smedley, Irvine, Calif.

[73] Assignee: California Institute of Technology, Pasadena, Calif.

[21] Appl. No.: 926,856

[22] Filed: Aug. 6, 1992

Related U.S. Application Data

[63] Continuation-in-part of Ser. No. 752,068, Aug. 29, 1991, abandoned, which is a continuation-in-part of Ser. No. 578,017, Sep. 4, 1990, abandoned.

[51] Int. Cl.⁵ ............................................. G05F 1/56
[52] U.S. Cl. .................................. 323/284; 323/282; 323/349; 363/124
[58] Field of Search ............... 323/273, 274, 275, 280, 323/282, 284, 349, 351, 222; 363/124, 16, 20

[56] References Cited

U.S. PATENT DOCUMENTS 3,659,184  4/1972  Schwarz.
4,862,057  8/1989  Contartese ........................ 323/285

Primary Examiner—Emanuel T. Voeltz
Attorney, Agent, or Firm—Loyal M. Hanson

[57] ABSTRACT

A switching circuit constructed according to the invention includes an input node, an output node, a reference node, a switch, and a feedback control circuit for cycling the switch in a series of cycles of variable switch duty ratio in order to produce a chopped signal at the output node. One form of the feedback control circuit integrates the chopped signal during each cycle in order to produce a feedback signal indicative of the average value of the chopped signal during each cycle. A comparator circuit produces a control signal indicative of an occurrence of a condition in which the level of the feedback signal equals the level of the reference signal, and a switch control circuit varies the switch duty ratio according to the occurrence of that condition in order to maintain the average value of the chopped signal linearly related to the reference signal. Another form of the feedback control circuit produces a feedback signal indicative of the difference between the time-integrated value of the chopped signal and the time-integrated value of a reference signal coupled to the reference node during each cycle. A comparator circuit produces a control signal indicative of an occurrence of a condition in which the difference between the time-integrated value of the chopped signal and the time-integrated value of the reference signal is zero, and a switch control circuit varies the switch duty ratio according to the occurrence of that condition without integrator reset.

12 Claims, 4 Drawing Sheets

ONE-CYCLE CONTROLLED SWITCHING CIRCUIT

CROSS REFERENCE TO RELATED APPLICATION

This application is a continuation in part of U.S. patent application Ser. No. 752,068 filed Aug. 29, 1991 now abandoned which is a continuation in part of U.S. patent application Ser. No. 578,017 filed Sep. 4, 1990.

BACKGROUND OF THE INVENTION

1. Technical Field.

This invention relates generally to switching circuitry for power and signal processing applications. More particularly, it concerns a one-cycle controlled switching circuit that renders the average value of the switched signal independent of disturbances. It also concerns a feedback control circuit that overcomes integrator reset problems in a way adaptable to constant frequency, constant ON-time, constant OFF-time, or variable switching circuits.

2. Background Information

U.S. patent application Ser. No. 752,068 filed Aug. 29, 1991 (the parent application) describes a one-cycle controlled switching circuit for power and signal processing applications. It effectively renders the output independent of disturbances such as input perturbations, load changes, and switching non-linearities. It does so by controlling the switch duty ratio for each cycle to significantly enhance switching circuit operation.

U.S. Pat. No. 4,862,057 to Contartese et al. also describes a switching circuit that controls the switch duty ratio. During each switch closure, the Contartese circuit multiplies the input voltage by the input current, integrates the product, extracts the square root, and then opens the switch when the square root exceeds a reference voltage. Doing so maintains the energy independent of input disturbances.

However, the Contartese circuit fails to render the chopped output signal independent of input perturbations and load changes because the output signal recovers only after many cycles. Further, the Contartese circuit does not produce a linear relation between the control reference signal and the switch output signal. The one-cycle switching circuit of this invention overcomes those drawbacks by integrating the chopped output signal y(t) during each switching cycle to produce a feedback signal $v_{int}$ indicative of the average value of the chopped signal during the cycle. Then, a comparator-and-switch-control circuit responds to the feedback signal $v_{int}$ and a reference signal $v_{ref}$ by varying the switch duty ratio as necessary to maintain the average value of the chopped signal at the indicated level during each cycle.

As a result, the average value of the chopped signal during any cycle is independent of disturbances. Input pertubations and load changes may affect the instantaneous value of the switch output signal during a cycle, but will not affect the average value because recover from a disturbance is completed in one cycle. Further, one-cycle control produces a linear relation between the control signal and the switch output signal. So, one-cycle feedback control based upon integration of the chopped output signal significantly enhances switching circuit operation.

In addition, the Contartese circuit integrates from the beginning of each cycle until the switching condition exists. It then resets the integrator to zero to await the beginning of the next cycle. In doing so, it does not maintain the energy constant in the discontinous current operation. Furthermore, resetting that way does not work with constant-on-time, constant-off-time, or variable switching circuits.

Recall that a constant-frequency switch is one in which the sum of the time the switch in the ON state and the time the switch is in the OFF state remains constant from one cycle to the next. So, integrating from the beginning of the ON state and resetting before the next cycle would appear to be a logical technique. A constant-on-time switch, however, is one in which the time the switch is in the ON state remains constant from one cycle to the next (i.e., the time it is in the OFF state is varied). A constant-off-time switch is one in which the time the switch is in the OFF state is constant from one cycle to the next (i.e, the time the switch is in the ON state is varied). A variable switch is one in which both the time the switch is in the ON state and the time it is in the OFF state may vary from one cycle to the next. Integrating from the beginning of the ON state and resetting to zero before the next cycle does not cause the average value of the chopped output signal to follow the control reference signal in each cycle for those switches. Thus, the one-cycle control technique described in the parent application needs feedback control circuitry that will work with all types of switches.

SUMMARY OF THE INVENTION

This invention solves the problems outlined above. It maintains the average value of the chopped signal for each switching cycle at a level indicated by a reference signal $v_{ref}$ in the manner described in the parent application. That technique renders the average value of the chopped signal for each switching cycle independent of disturbances. To do so, the illustrated circuits continuously integrate the difference between the chopped signal y(t) and a reference signal $v_{ref}$. The resulting time-integrated signal $v_{int}$ returns to zero (or some predetermined circuit offset value) each cycle when the time-integrated value of y(t) equals the time-integrated value of $v_{ref}$ for that switching cycle. The feedback circuit bases switching on the occurrence of that condition.

Thus, the one-cycle controlled switching circuit of this invention works with constant-frequency, constant-on-time, constant-off-time, and variable switching circuits. Moreover, the average value of y(t) faithfully follows the average value of $v_{ref}$ in each cycle, even though $v_{ref}$ may be a time-varying signal. So, the one-cycle controlled switching circuit acts as a linear amplifier. In other words, the average value Y(t) of the chopped signal y(t) during any cycle equals the average value $V_{ref}$ of the reference signal $v_{ref}$ times a constant reflecting component values in the integrator circuit, despite switching and other circuit nonlinearities.

In terms of the claim language subsequently developed, a switching circuit constructed according to the invention includes an input node, an output node, a reference node, a switch, and a feedback control circuit. The switch is coupled to the input and output nodes. It has an ON state in which it couples the input node to the output node and an OFF state in which it decouples the input node from the output node. The feedback control circuit cycles the switch between the ON state and the OFF state in a series of cycles of variable switch duty ratio in order to produce a chopped signal at the output node from an input signal coupled to the input node.

According to one aspect of the invention, the control feedback circuit includes an integrator circuit coupled to the output node for integrating the chopped signal during each cycle in order to produce a feedback signal indicative of the average value of the chopped signal during each cycle. A comparator circuit responds to the feedback signal and a reference signal coupled to the reference node by producing a control signal indicative of an occurrence of a condition in which the level of the feedback signal equals the level of the reference signal. A switch control circuit responds to the control signal by varying the switch duty ratio according to the occurrence of the condition in which the level of the feedback signal equals the level of the reference signal in order to maintain the average value of the chopped signal linearly related to the reference signal.

Another aspect of the invention extends one-cycle control to all type switches. To do so, the integrator circuit produces a feedback signal indicative of the difference between the time-integrated value of the chopped signal and the time-integrated value of a reference signal coupled to the reference node during each cycle. The comparator circuit produces a control signal indicative of an occurrence of a condition in which the difference between the time-integrated value of the chopped signal and the time-integrated value of the reference signal is zero. The switch control circuit varies the switch duty ratio based upon the occurrence of that condition. The technique readily adapts to constant-frequency, constant-on-time, constant-off-time, and variable switches.

Stated another way, the integrator circuit produces a signal representing the difference between a first constant times the time-integrated value of the chopped signal and a second constant times the time-integrated value of the reference signal. The constants are set by integrator circuit values. They may be equal and they may equal one as is the case in the illustrated embodiments. Switching occurs when the difference is zero. That keeps the average value of the chopped output signal linearly related to the average value of the reference signal on a per cycle basis in a way that readily adapts to any type switch.

In line with the above, a method of producing a regulated chopped signal, includes the step of providing a switching circuit having an input node, an output node, a reference node, and a switch coupled to the input node and output node. The switch has an ON state in which it couples the input node to the output node and an OFF state in which it decouples the input node from the output node. The method proceeds by cycling the switch between the ON state and the OFF state in a series of cycles of variable switch duty ratio in order to produce a chopped signal at the output node from an input signal coupled to the input node.

As that is done, the chopped signal is integrated in order to produce a feedback signal indicative of the average value of the chopped signal during each cycle. The level of the feedback signal is compared with the level of a reference signal and switching to the OFF state and integrator reset proceeds according to the comparison. Alternatively, the method produces a feedback signal indicative of the difference between the time-integrated values of the chopped and reference signals and bases switching upon the occurrence of the zero condition described above.

The foregoing and other objects, features, and advantages of the invention become more apparent upon reading the following detailed description with reference to the illustrative drawings.

DESCRIPTION OF THE PREFERRED EMBODIMENTS

Figure 1:
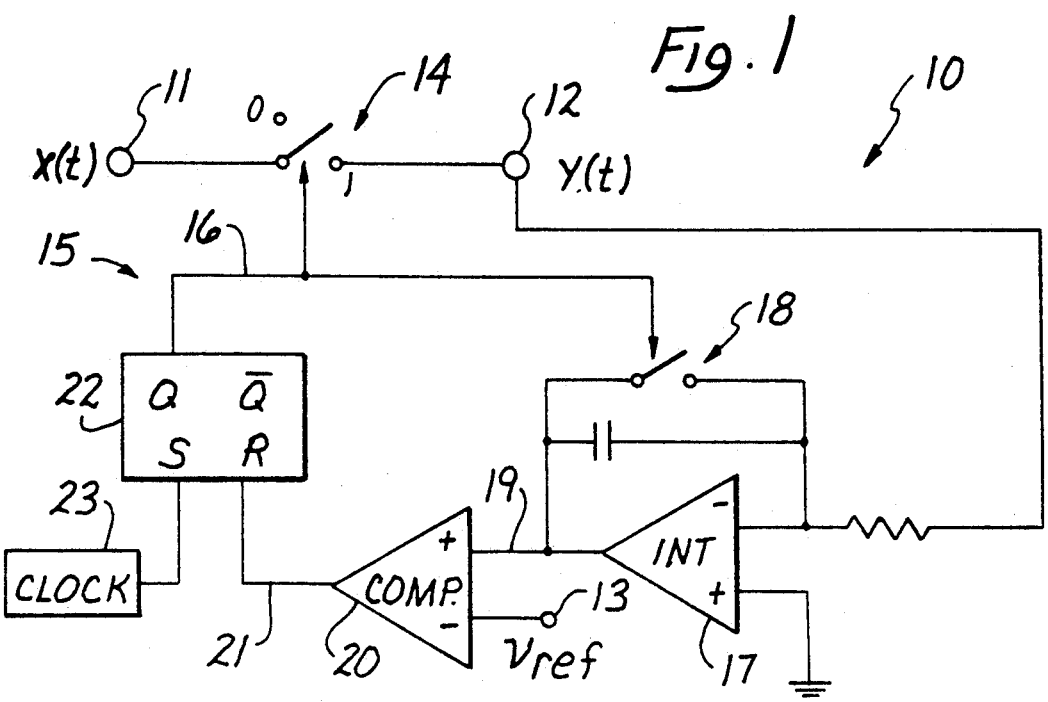
FIG. 1 is a schematic circuit diagram of a constant-frequency switching circuit constructed according to one aspect the invention.

FIG. 1 of the drawings shows a constant-frequency switching circuit 10 constructed according to the invention. Generally, it includes an input node 11, an output node 12, a reference node 13, a switch 14, and a feedback control circuit 15. The switch 14 is coupled to the input node 11 and the output node 12. It may take any of various know forms and include solid state switching circuitry. It has an ON state in which it couples the input node 11 to the output node 12 and an OFF state in which it decouples the input node 11 from the output node 12.

Figure 2:
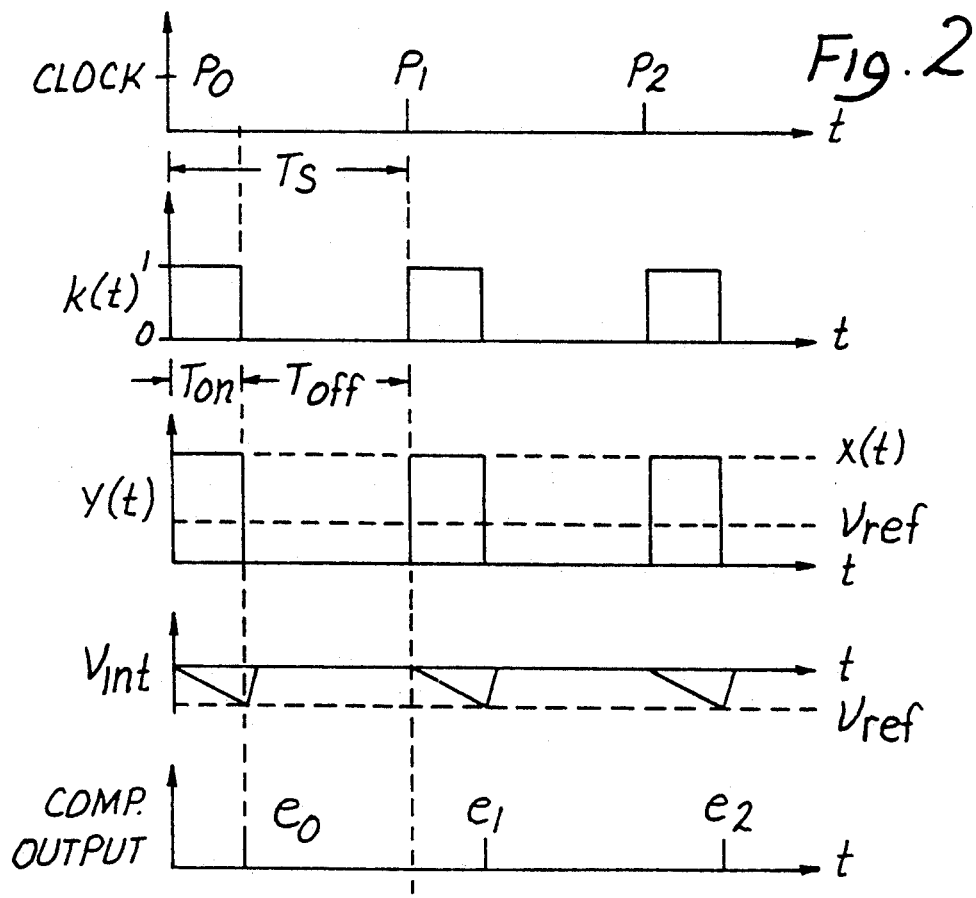
FIG. 2 is a timing diagram for the switching circuit in FIG. 1.

The feedback control circuit 15 serves as means for cycling the switch 14 between the ON state and the OFF state in a series of switching cycles of variable switch duty ratio in order to produce a chopped output signal y(t) at the output node 12 from an input signal x(t) coupled to the input node 11. One cycle is designated by $T_s$ in FIG. 2. $T_s$ for any cycle is the sum of the period of time the switch is in the ON state for that cycle ($T_{on}$) and the period of time the switch is in the OFF state for that cycle ($T_{off}$). The switch duty ratio for any cycle is the ratio of $T_{on}$ to the $T_s$.

To cycle the switch 14 between the ON state and the OFF state while varying the switch duty ratio, the feedback control circuit 15 produces a switch control signal k(t) on a line 16 (FIG. 1). The feedback control circuit 15 varies the switch control signal k(t) between first and second states to switch the switch 14. The first state is designated as a "0" state in FIG. 2 and it causes the switch 14 to switch to the OFF state. The second state is designated as a "1" state and it causes the switch 14 to switch to the ON state. The feedback control circuit 15 varies the switch control signal k(t) between the "0" and "1" states to cycle the switch 14 and vary the switch duty ratio. It does so to produce the chopped output signal y(t) while controlling the average value of the chopped output signal for each cycle according to a reference signal $v_{ref}$ coupled to the reference node 13. Timing is illustrated in the timing diagram of FIG. 2. Based upon the foregoing and subsequent descriptions, one of ordinary skill in the art may implement the feedback control circuit 15 in various ways to function as stated and illustrated using known components and design techniques.

To control the average value of the chopped output signal y(t) for each cycle, the feedback control circuit 15 integrates the chopped signal y(t) during each cycle, compares it with the reference signal $v_{ref}$, and then varies the switch duty ratio appropriately to maintain the average value of the chopped signal during the cycle at the level indicated by the reference voltage. To do that, the feedback control circuit 15 includes an integrator 17 with reset circuitry 18 (FIG. 1). The integrator 17 is suitably coupled to the output node 12 to integrate the chopped signal y(t) during each cycle in order to produce a feedback signal $v_{int}$ indicative of the average value of the chopped signal y(t) during each cycle. The reset circuitry 18, resets the integrator 17 to zero (or other initial value) as subsequently described.

The feedback signal $v_{int}$ is coupled by a line 19 to a comparator 20 along with the reference signal $v_{ref}$. The comparator 20 responds to the feedback signal and the reference signal by producing a control signal indicative of each occurrence of a condition in which the level of the feedback signal $v_{int}$ equals the level of the reference signal $v_{ref}$. The illustrated comparator 20 produces a pulse upon each occurrence as designated by $e_0$, $e_1$, and $e_2$ in FIG. 2. A line 21 couples that control signal to timing circuitry in the form of a flipflop 22 and a clock 23.

The clock 23 produces a series of clock pulses at a constant frequency (e.g., 50 KHz). They are designated as clock pulses $p_0$, $p_1$, and $p_2$ in FIG. 2. Each clock pulse sets the flipflop 22 and that changes the switch control signal k(t) to the "1" state to close the switch 14. It also opens the reset circuitry 18 to allow the integrator 17 to begin integrating the chopped signal y(t). Each of the pulses $e_0$, $e_1$, and $e_2$ resets the flipflop 22 and that changes the switch control signal k(t) to the "0" state to open the switch 14. It also closes the reset circuitry 18 in order to reset the integrator 17 to zero.

As a result, the switch 14 is in the ON state each cycle only long enough to allow the feedback signal $v_{int}$ to reach the level of the reference signal $v_{ref}$. That maintains the average level of the chopped signal y(t) for each cycle at a level indicated by the reference signal. It thereby renders the chopped signal independent of input perturbations, load changes, and switching non-linearities.

Figure 3:
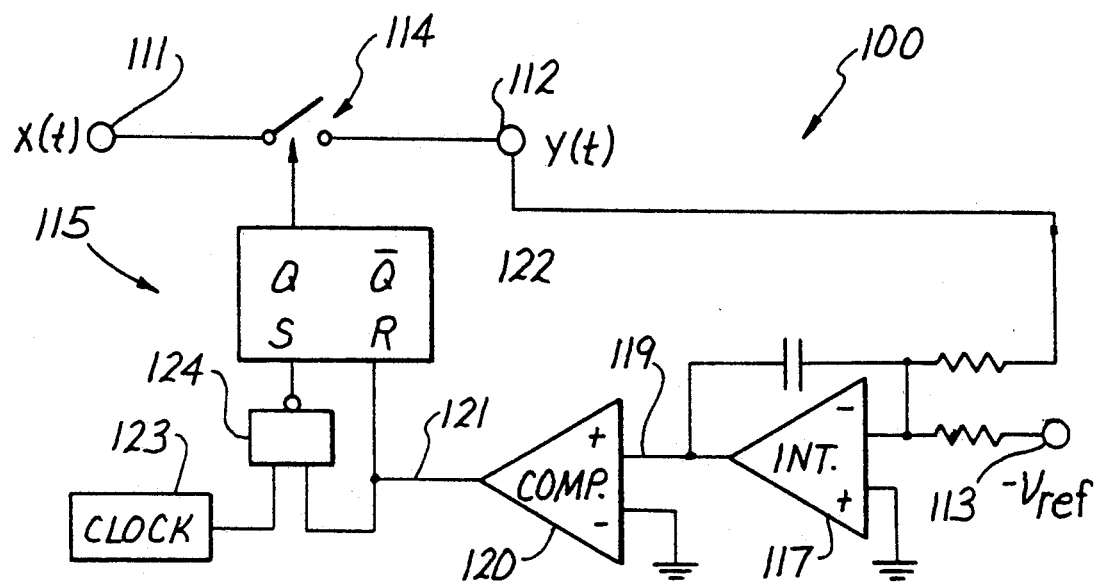
FIG. 3 is a schematic circuit diagram of a constant-frequency second embodiment of a switching circuit constructed according to the invention.
Figure 4:
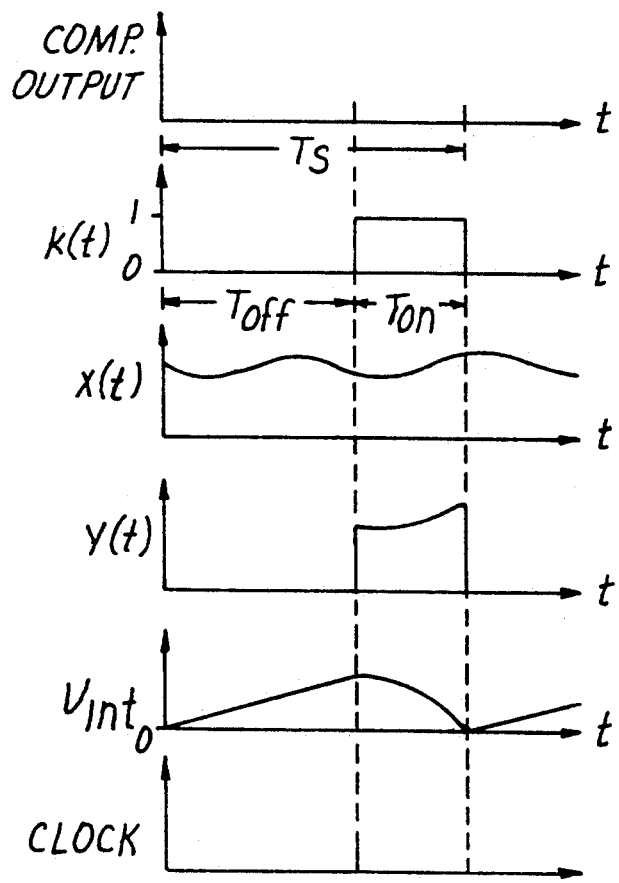
FIG. 4 is a timing diagram for the second embodiment.

FIG. 3 shows another switching circuit 100 constructed according to the invention. It is similar in many respects to the switching circuit 10 and so only differences are described in further detail. For convenience, reference numerals designating parts of the switching circuit 100 are increased by one hundred over those designating corresponding parts of the switching circuit 10.

One difference concerns integrator reset. The switching circuit 100 avoids it. Instead of integrating the chopped signal, the feedback control circuit 115 integrates the difference between the chopped signal and the reference signal and bases the switching upon the difference reaching zero.

For that purpose, the feedback control circuit 115 includes an integrator 117 that produces a feedback signal indicative of the difference between the time-integrated value of the chopped signal and the time-integrated value of a reference signal coupled to the reference node during each cycle. To do that, the integrator 117 integrates a chopped signal of one polarity and a reference signal of the opposite polarity. A comparator 120 responsive to the feedback signal produces a control signal indicative of an occurrence of a condition in which the difference between the time-integrated value of the chopped signal and the time-integrated value of the reference signal is zero. A switch control circuit in the form of flipflop 122, clock 123, and NAND gate 124 respond to the control signal by varying k(t) and thereby the switch duty ratio according to the occurrence of the condition in which the difference between the time-integrated value of the chopped signal and the time-integrated value of the reference signal is zero.

A typical cycle starts with the switch 114 in the OFF state (i.e., y(t)=0). With the Switch 114 in the OFF state, the integrator 117 integrates only the reference signal ($-v_{ref}$) and so v(t) at the output of the integrator 117 has a positive value which is compared by the comparator 120 with ground level. With v(t) more positive than ground level, the comparator 120 opens the NAND gate 124 to enable the clock signal from the clock 123. A clock pulse from the clock 123 sets the flipflop 122 which switches the switch 114 to the ON state.

With the switch 114 in the ON state, the contribution of y(t) to $v_{int}$ is greater than the contribution of $-v_{ref}$ and so $v_{int}$ decreases in value until it reaches zero. When that condition occurs, the comparator 120 produces a pulse that resets the flipflop 122 which switches the switch 114 back to the OFF state to begin the next cycle.

Figure 5:
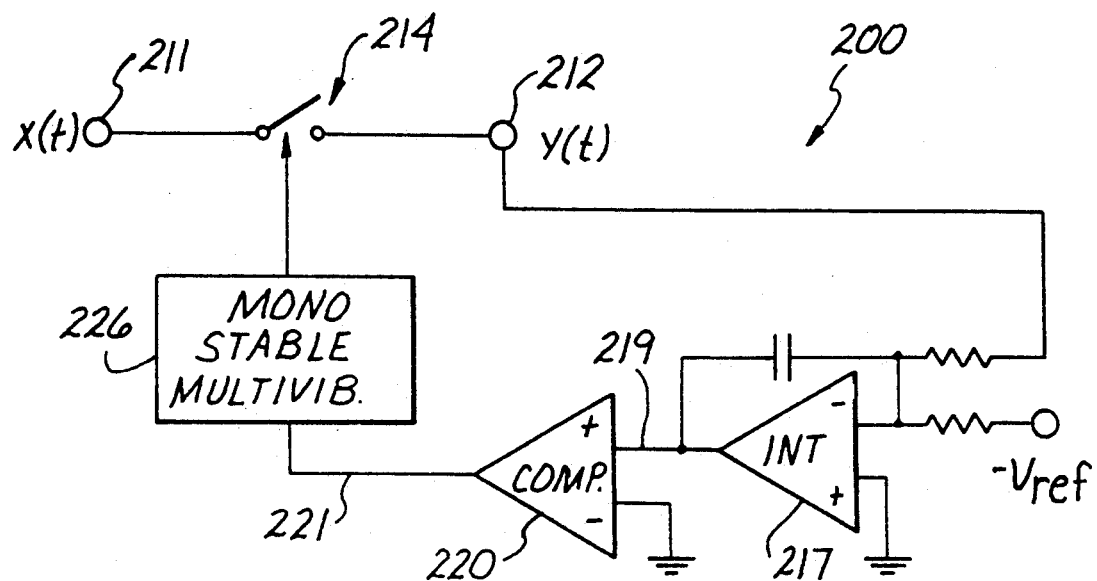
FIG. 5 is a schematic circuit diagram of a constant-on-time third embodiment constructed according to the invention.

FIG. 5 shows yet another switching circuit 200 constructed according to the invention. It is similar in many respects to the switching circuit 100. However, it functions as a constant-on-time switch. Reference numerals are increased by one hundred over those of the switching circuit 100.

To achieve a constant on-time, the switch control circuit includes a monostable multivibrator 226 that produces an output pulse of fixed duration as the switch control signal. Occurrence of the zero condition fires the multivibrator 226 to change the switch control signal k(t) to the "1" state for a constant on-time period, $T_{on}$. In many applications (e.g., a resonant converter), constant on time is a circuit feature. In such a case, no monostable multivibrator is necessary to achieve constant on time control.

Figure 6:
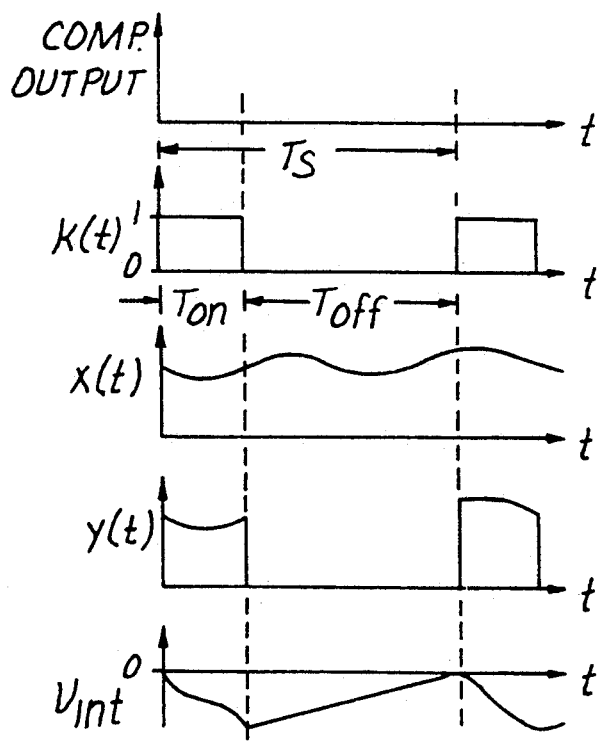
FIG. 6 is a timing diagram for the third embodiment.

FIG. 6 shows the timing. A typical cycle starts with the switch 214 in the ON state. Remember that the contribution of the chopped signal y(t) to $v_{int}$ is greater than the contribution of the reference signal $v_{ref}$, due to signal levels and/or integrator circuit values. So when k(t) is in the "1" state, the feedback signal $v_{int}$ increases in the negative direction. When k(t) goes back to the "0" state after the constant-on-time period $T_{on}$, the feedback signal $v_{int}$ eventually returns to zero to again fire the multivibrator 226 for the next cycle.

Figure 7:
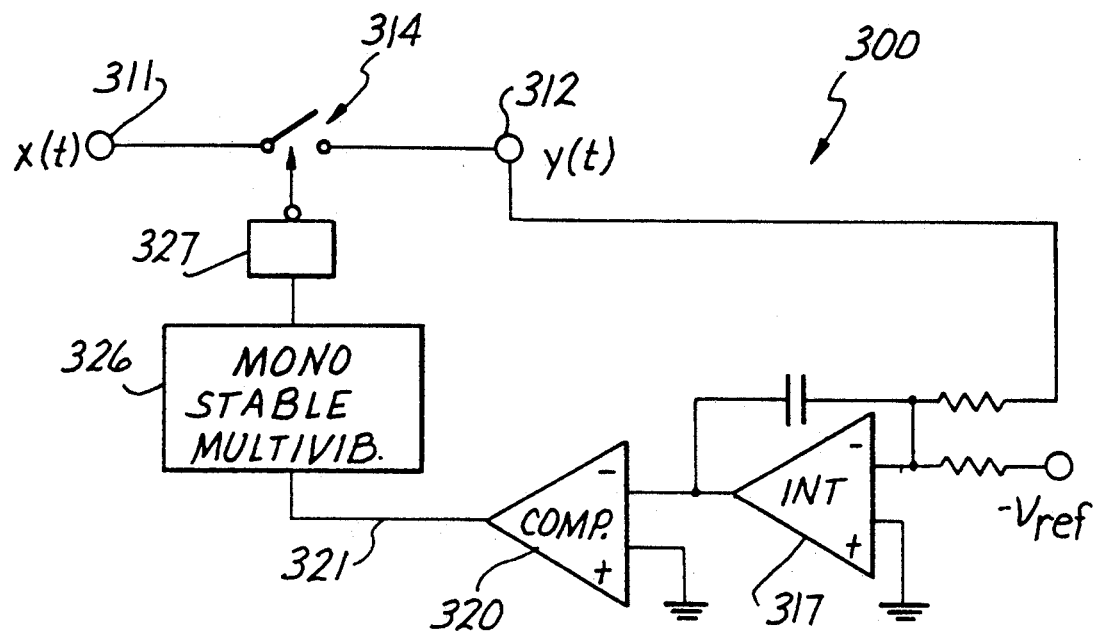
FIG. 7 is a schematic circuit diagram of a constant-off-time fourth embodiment.

FIG. 7 shows a constant-off-time switching circuit 300. Operation is similar to that of the constant-on-time circuit except that a NAND gate 327 inverts the output of the multivibrator 326 to cause k(t) to go to the "0" state for a constant-off-time period $T_{off}$.

Figure 8:
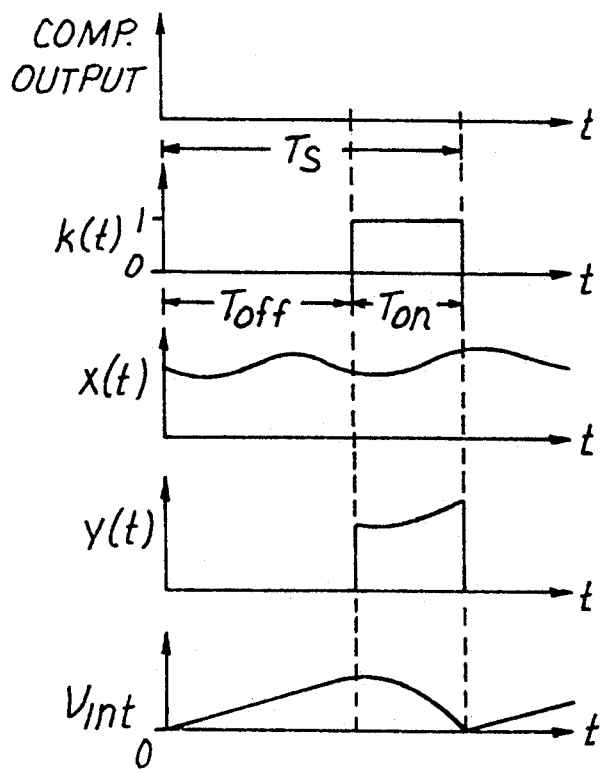
FIG. 8 is a timing diagram for the fourth embodiment.

FIG. 8 shows the timing. A typical cycle starts with the switch 314 in the OFF state, when the output of the monostable multivibrator 226 is in a "1" state. The NAND gate 327 inverts the output of the multivibrator 326 so that k(t) is in the "0" state. During the $T_{off}$, y(t)=0 and so $v_{int}$ increases in the positive direction and the comparator 220 output remains low. After a constant T$_{off}$, the multivibrator 326 changes to a "0" state which is inverted by the NAND gate 127 to switch the switch 314 to the ON state. Then, v$_{int}$ decreases until it reaches zero. When it reaches zero, the comparator 320 produces a pulse which triggers the multivibrator 326 to cause the switch 314 to go to the OFF state and begin the next cycle.

Of course, component values of the integrator circuits 117, 217, and 317 may be chosen to integrate the difference between the chopped signal and a constant multiple of the reference signal. In that way, the average value of the chopped signal may be maintained at a level that is a constant multiple of the average value of the reference signal. For that reason, the claims specify a "constant multiple."

Thus, the invention maintains the average value of the chopped signal for each switching cycle at a level indicated by a reference signal v$_{ref}$ in the manner described in the parent application. That renders the average value of the chopped signal for each switching cycle independent of disturbances. In addition, various illustrated embodiments continuously integrate the difference between the chopped signal y(t) and a reference signal v$_{ref}$ without integrator reset. That technique readily adapts to constant-frequency, constant-on-time, constant-off-time, and variable switching circuits. In addition, the average value of y(t) faithfully follows the average value of v$_{ref}$ so that the one-cycle controlled switching circuit acts as a linear amplifier.

Although exemplary embodiments have been shown and described, one of ordinary skill in the art may make many changes, modifications, and substitutions without necessarily departing from the spirit and scope of the invention.

What is claimed is:

1. A switching circuit, comprising:
   an input node, an output node, and a reference node;
   a switch coupled to the input node and output node, the switch having an ON state in which it couples the input node to the output node and an OFF state in which it decouples the input node from the output node; and
   means in the form of a feedback control circuit for cycling the switch between the ON state and the OFF state in a series of cycles of variable switch duty ratio in order to produce a chopped signal at the output node from an input signal coupled to the input node;
   the feedback control circuit including means for producing a feedback signal that has a level that is a constant multiple of the time-integrated value of the voltage level of the chopped signal, the means for producing a feedback signal including means for integrating the voltage level of the chopped signal during each cycle in order to produce the feedback signal, and the means for integrating the voltage level of the chopped signal including an integrator circuit operatively coupled to the output node;
   the feedback control circuit including means in the form of a comparator circuit responsive to the feedback signal and a reference signal coupled to the reference node for producing a control signal indicative of an occurrence of a condition in which the level of the feedback signal equals the level of the reference signal; and
   the feedback control circuit including means in the form of a switch control circuit responsive to the control signal for varying the switch duty ratio according to the occurrence of the condition in which the level of the feedback signal equals the level of the reference signal in order to maintain the average value of voltage level of the chopped signal linearly related to the reference signal.

2. A switching circuit as recited in claim 1, wherein the switch control circuit is configured to cycle the switch between the ON state and the OFF state at a constant rate, to switch the switch to the ON state at the beginning of each cycle, and to switch the switch back to the OFF state and reset the integrator circuit upon the occurrence of the condition in which the level of the feedback signal equals the level of the reference signal.

3. A switching circuit, comprising:
   an input node, an output node, and a reference node;
   a switch coupled to the input node and output node, the switch having an ON state in which it couples the input node to the output node and an OFF state in which it decouples the input node from the output node; and
   means in the form of a feedback control circuit for cycling the switch between the ON state and the OFF state in a series of cycles of variable switch duty ratio in order to produce a chopped signal at the output node from an input signal coupled to the input node;
   the feedback control circuit including means for producing a feedback signal that has a level that is a constant multiple of the difference between the time-integrated value of voltage level of the chopped signal and a constant multiple of the time-integrated value of the voltage level of a reference signal coupled to the reference node, the means for producing a feedback signal including means for integrating the voltage level of the chopped signal during each cycle in order to produce the feedback signal, the means for integrating the voltage level of the chopped signal including an integrator circuit operatively coupled to the output node;
   the feedback control circuit including means in the form of a comparator circuit responsive to the feedback signal for producing a control signal indicative of an occurrence of a condition in which the feedback signal equals zero; and
   the feedback control circuit including means in the form of a switch control circuit responsive to the control signal for varying the switch duty ratio according to the occurrence of the condition in which the feedback signal equals zero in order to maintain the average value of the voltage level of the chopped signal linearly related to the average value of the reference signal.

4. A switching circuit as recited in claim 3, wherein the switch control circuit is configured to cycle the switch between the ON state and the OFF state at a constant rate, to switch the switch to the ON state at the beginning of each cycle, and to switch the switch back to the OFF state upon the occurrence of the condition in which the feedback signal equals zero.

5. A switching circuit as recited in claim 3, wherein the switch control circuit is configured to switch the switch to the ON state for a constant period of time upon each occurrence of the condition in which the feedback signal equals zero, and to then switch the switch back to the OFF state until the next occurrence of that condition.

6. A switching circuit as recited in claim 3, wherein the switch control circuit is configured to switch the switch to the OFF state for a constant period of time upon each occurrence of the condition in which the feedback signal equals zero, and to then switch the switch back to the ON state until the next occurrence of that condition.

7. A method of producing a regulated chopped signal, comprising:

providing a switching circuit having an input node, an output node, a reference node, and a switch coupled to the input node and output node, the switch having an ON state in which it couples the input node to the output node and an OFF state in which it decouples the input node from the output node;

cycling the switch between the ON state and the OFF state in a periodic series of cycles of variable switch duty ratio in order to produce a chopped signal at the output node from an input signal coupled to the input node;

integrating the voltage level of the chopped signal during each cycle in order to produce a feedback signal that has a level that is a constant multiple of the time-integrated value of the voltage level of the chopped signal producing a control signal indicative of a condition in which the level of the feedback signal equals the level of a reference signal coupled to the reference node; and varying the switch duty ratio in response to the control signal according to the occurrence of the condition in which the level of the feedback signal equals the level of the reference signal in order to maintain the average value of the voltage level of the chopped signal linearly related to the reference signal.

8. A method as recited in claim 7, wherein the step of varying the switch duty ratio includes cycling the switch between the ON state and the OFF state at a constant rate, switching the switch to the ON state at the beginning of each cycle, and switching the switch back to the OFF state the occurrence of the condition in which the level of the feedback signal equals the level of the reference signal.

9. A method of producing a regulated chopped signal, comprising:

providing a switching circuit having an input node, an output node, a reference node, and a switch coupled to the input node and output node, the switch having an ON state in which it couples the input node to the output node and an OFF state in which it decouples the input node from the output node;

cycling the switch between the ON state and the OFF state in a series of cycles of variable switch duty ratio in order to produce a chopped signal at the output node from an input signal coupled to the input node;

producing a feedback signal having a level that is a constant multiple of the difference between the time-integrated value of the voltage level of the chopped signal and a constant multiple of the time-integrated value of the voltage level of a reference signal coupled to the reference node;

producing a control signal indicative of the occurrence of a condition in which the feedback signal equals zero; and varying the switch duty ratio in response to the control signal according to the occurrence of the condition in which the feedback signal equals zero in order to maintain the average value of the voltage level of the chopped signal linearly related to the average value of the reference signal.

10. A method as recited in claim 9, wherein the step of varying the switch duty ratio includes cycling the switch between the ON state and the OFF state at a constant rate, switching the switch to the ON state at the beginning of each cycle, and switching the switch back to the OFF state upon the occurrence of the condition in which the feedback signal equals zero.

11. A method as recited in claim 9, wherein the step of varying the switch duty ratio includes switching the switch to the ON state for a constant period of time upon each occurrence of the condition in which the feedback signal equals zero, and then switching the switch back to the OFF state until the next occurrence of that condition.

12. A method as recited in claim 9, wherein the step of varying the switch duty ratio includes switching the switch to the OFF state for a constant period of time upon each occurrence of the condition in which the feedback signal equals zero, and then switching the switch back to the ON state until the next occurrence of that condition.

* * * * *